United States Patent [19]
Meidell

[11] Patent Number: 4,938,168
[45] Date of Patent: Jul. 3, 1990

[54] HUMMINGBIRD FEEDER

[76] Inventor: Dorothy H. Meidell, 5506 P Paseo del Lago, Laguna Hills, Calif. 92653

[21] Appl. No.: 239,644

[22] Filed: Sep. 2, 1988

[51] Int. Cl.⁵ ............................................. A01K 39/00
[52] U.S. Cl. ..................................................... 119/77
[58] Field of Search ...................... 119/51 R, 77, 51.5

[56] References Cited
U.S. PATENT DOCUMENTS

| | | | |
|---|---|---|---|
| 3,125,069 | 3/1964 | Fowler | 119/77 |
| 3,301,220 | 1/1967 | Queen | 119/77 |
| 4,558,662 | 12/1985 | Peterson | 119/77 |

OTHER PUBLICATIONS

"Hummingbird Bird Feeder", National Geographic Magazine, Jun. 1929 and Aug. 1947.
Popular Mechanics, "Hummingbird Cafeteria", Richard W. Emery, pp. 123-125, Dec. 1946.

Primary Examiner—Robert P. Swiatek
Assistant Examiner—R. Thomas Price
Attorney, Agent, or Firm—James E. Hawes

[57] ABSTRACT

Embodiments of a neew hummingbird feeder are disclosed, each effectively preventing birds and bees from feeding, yet allowing hummingbirds to feed, by providing upwardly projecting feeding channels with outer openings that are at least ¾ of an inch (and preferably 1⅜ inches) beyond the normal level of feeding solution in the dispensing cap.

8 Claims, 1 Drawing Sheet

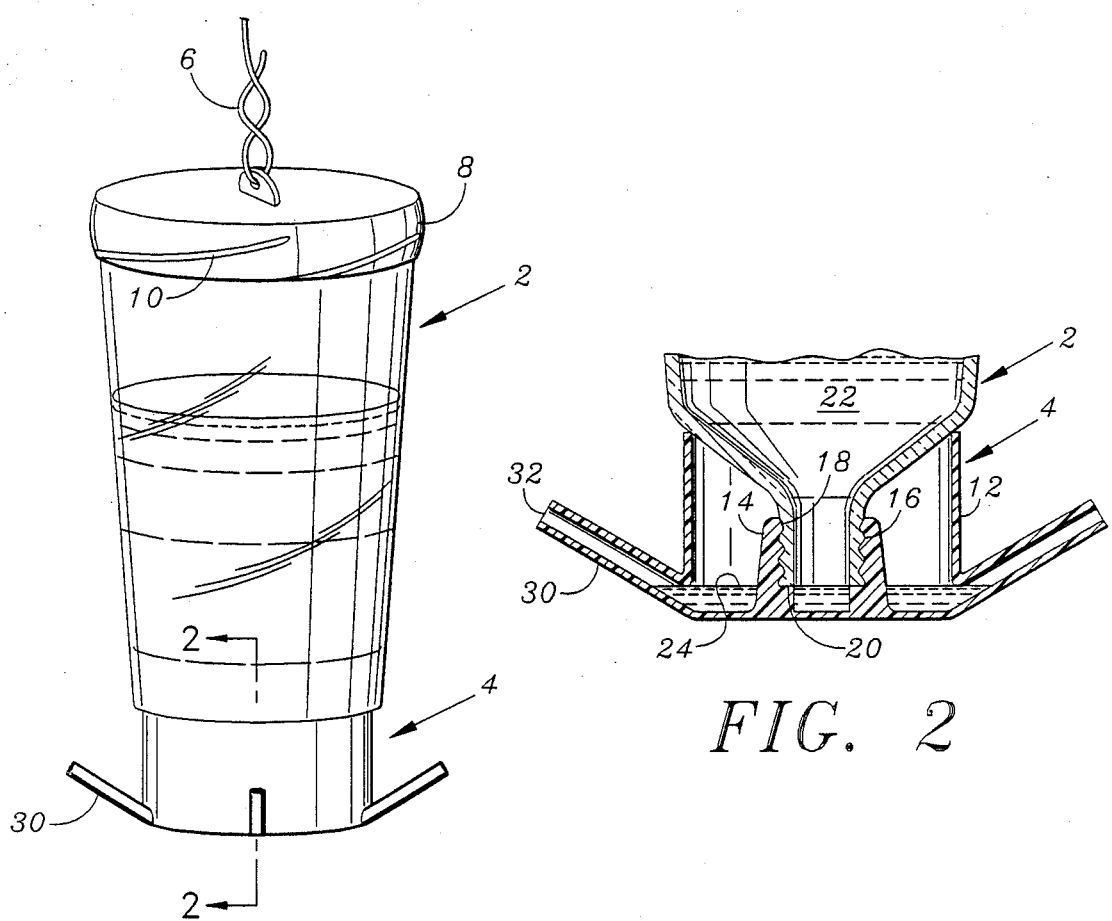
FIG. 1
FIG. 2
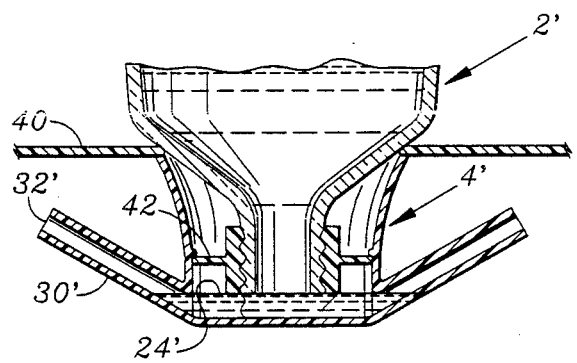
FIG. 3

HUMMINGBIRD FEEDER

INTRODUCTION

This invention relates to a hummingbird feeder, one particularly adapted to feed hummingbirds while preventing access by bees and other birds.

The hummingbird feeder in common use today is simply a bottle hung upside down in a container accessible through one or more slanted tubes, the hummingbirds withdrawing a sugar-water solution from the container through these slanted tubes, the container being refilled by liquid from the bottle. In an early design, this container was found to also provide access to bees; bees could feed on the sugar-water solution through the slanted tubes. For that reason, a cage-like cap was devised, the purpose of which was to prevent access to the tube by bees. In use, though, this cap has only been partially successful. Since it may slide down on the slanted tube, some users will improperly place the cage by sliding it all the way down on the tube, thereby again permitting bees to feed on the sugar-water in the container. Through use, the cap gradually may become loose enough to slide down on the tube of its own accord and permit bees to feed. In addition, the cap with its projecting tubes provides a ready perch for birds, also giving them access to the sugar-water within the container.

One object of the present invention is to provide a hummingbird feeder that is simple in design and economical to construct, yet which effectively prevents access to the feeder by bees and other birds Another object of the invention is to provide an attachment to a common hummingbird feeder that achieves the objects of the invention. A further object is to provide such a construction that is easily used and cleaned. These and further objects of the invention will be apparent from the following description of preferred embodiments thereof.

BRIEF SUMMARY OF THE INVENTION

The hummingbird feeder includes a receptacle for dispensing feeding solution, and a container connected to replenish solution within the receptacle as it is withdrawn by feeding hummingbirds. A tubular channel communicates with the receptacle, and its outlet is positioned at least ¾ of an inch in length above and beyond the normal solution level in the receptacle. Preferably this tubular channel is molded as part of the receptacle and projects outwardly. The feeder may include means, such as a removable collar, to disuade birds from using the feeder.

BRIEF DESCRIPTION OF THE DRAWING

The invention is further described in connection with the accompanying drawings, in which:

FIG. 1 is a perspective view of a hummingbird feeder constructed in accordance with the teachings of the present invention;

FIG. 2 is a partial cross-sectional view of the feeder shown in FIG. 1 taken along lines 2—2; and FIG. 3 is a partial cross-sectional view of a another, alternate construction of the hummingbird feeder.

DETAILED DESCRIPTION

The style of hummingbird feeder in common use today includes a jar or bottle intended to hold a sugar-water solution, and a cap structure (or stopper) that is attached about the opening of the bottle These elements are constructed and arranged to dispense the sugar-water solution to one or more feeding tubes about the cap structure.

A hummingbird feeder of this general type, but which incorporates a preferred enbodiment of the present invention, is shown in FIG. 1. It includes a bottle 2 and a dispensing cap structure 4. The bottle is suspended from a hook or other convenient point of attachment by a wire strand 6 that is affixed to the up-ended base of the bottle by a cup 8 preferably screwed onto threads, molded about the bottle's base.

The preferred receptacle structure 4, shown in cross-section in FIG. 2, consists of a cup 12 within which is a series of upstanding flanges 14 that have threaded margins 16 which receive and interlock with threads 18 about the neck of the bottle 2. Shoulders 20 on the flanges bear on the mouth of the bottle to provide a positive stop for the bottle's engagement with the cap. In this fashion, the cap may be firmly attached to the bottle.

When up-ended, the bottle permits solution 22 within it to flow out of its mouth and into the dispensing cap structure 4 until the solution reaches a level 24 sufficient to seal the mouth of the bottle and prevent any further ingress of air into the bottle. The resulting slight vacuum at the top of the bottle, and air pressure on surface 24, prevent any further liquid from being dispensed from the bottle into the cap.

About the cap are a series of tubular projections 30 that are angled such that their openings are above the level 24 of liquid in the cap when the feeder is positioned as shown in FIG. 1. If the opening 32 of these feeding tubes 30 are close to the level of liquid within the feeder, any swaying of the feeder, such as may be induced by a breeze, will result in solution spilling through the openings, and thereby cause the feeder to drip. Also, the user will find that in up-ending the feeder to suspend it for use by hummingbirds, some of the solution in the bottle will easily drain through the feeding tubes if openings 32 are close to level 24, resulting in a feeder which is messy to use. By upwardly angling the feeding tubes sufficiently, as shown, the normal level of the liquid in the dispensing cap will be spaced from the feeding tube openings to avoid both of these objectionable characteristics.

Hummingbirds have bills and tubular tongues which are elongated sufficiently to permit them to drink nectar from deep-throated flowers. In contrast, bees have proboscies which enable them to feed on nectar in shallow flowers, or in flowers which can be forced apart. The common hummingbird feeder in use today positions the opening of the feeding tubes approximately ¼ inch above the level of the sugar solution in the dispenser cap. This distance is not sufficient to prevent access to the sugar solution by bees. For that reason, bees will tend to congregate about such a feeder, one by one attaching themselves to the tubes and feeding on sugar solution within the container. To prevent this, one construction of hummingbird feeder provides a separate cage structure designed to be mounted about the end of the tube, the cage (if positioned properly) preventing access by bees to the sugar solution contained within the feeder. However, often the cage structure will be positioned so that the tube is fully received within it, or through use will slide down on the tubes so that the tube is fully received within it, in which position bees can still feed on the solution within the cap. The present construction of hummingbird feeder prevents this in a simple but effective fashion.

In a preferred embodiment of the present feeder, each feeding tube 30 is of sufficient length to position the orifice 24 at least ¾ of an inch, and preferably no more than 1½ inches, from the normal surface 24 of the sugar solution within the dispensing cap. This distance has been found through experimentation to be longer than that which permits access by bees to the sugar solution within the feeder, and yet is short enough to permit access by hummingbirds to the solution within the feeder. In the preferred construction, the cylindrical bottle 2 has a band 2⅛ inches in diameter, is 6 inches high to its shoulder, the diameter of the shoulder being 1¾ inches, and each feeding tube is 1⅜ inches long. The bottle, when so formed, is easily cleaned. Also, the cap 4 and cups 8 preferably are of a color, such as red, to attract hummingbirds.

From time to time, those using a hummingbird feeder will find that birds other than hummingbirds will attempt to feed from it. For example, a finch may land on the projecting tube, its weight tipping the feeder sufficiently to cause the sugar solution to pour from the tube which it will then drink. Of course, when this occurs it produces quite a mess below the feeder.

While the feeder construction shown in FIGS. 1 and 2 is preferred, many of the advantages of the present invention can be obtained from certain prior constructions of hummingbird feeders by some simple modifications. For example, as shown in FIG. 3, a common prior feeder construction includes a disc 40 received in a cap 4' between pairs of projections. The feeder tubes 30' of that cap easily may be elongated to position their openings 32 at least ¾ inches (and preferably no more than 1½ inches) beyond level 24' of the solution in the cap and tubes. Also to prevent birds from landing on the feeding tubes 30' (or 30) a disc 42 with a central opening rests on top of the dispensing cap 4' and around bottle 2'. This disc may be 6 to 8 inches in diameter, and of a color (e.g. red) to attract hummingbirds. It will prevent birds other than hummingbirds from using the feeder. Of course, various other structures could be devised and employed to also disuade or inhibit birds from landing on the projecting tubes.

While preferred embodiments of the invention have been shown and described, it will be apparent to those skilled in this art that various modification may be made in these embodiments without departing from the spirit of the present invention. For that reason, the scope of the invention is set forth in the following claims:

I claim:

1. In a hummingbird feeder including a receptacle for holding at a predetermined level a liquid solution dispensed from a container to be fed to hummingbirds, the receptacle including an outer wall, means with the receptacle and spaced from the outer wall for attaching the receptacle to the container to receive said liquid solution and to hold said solution within said receptacle at said predetermined level, and between said outer wall and said means for attaching at least one tubular at least one channel in communication with the interior of the receptacle, the channel terminating in an opening positioned above and spaced at least ¾ of an inch from said predetermined level of the liquid solution, the channel being substantially straight.

2. In a hummingbird feeder as set forth in claim 1, means connected to said receptacle for inhibiting birds from resting thereon.

3. In a hummingbird feeder as set forth in claim 2, in which the means to inhibit birds from landing on the tubular structure includes a disc extending outward from the receptacle and overlying, but spaced from the opening with at least one tubular member sufficiently to permit access by hummingbirds to the opening.

4. In a hummingbird feeder as set forth in claim 1, the receptacle including a plurality of tubular channels, each channel being integral with the receptacle.

5. A hummingbird feeder including:
   A container for receiving a liquid solution to be fed to hummingbirds;
   A receptacle in fluid communication with the container for receiving a predetermined amount of said solution and for holding said solution at a predetermined level therein, the receptacle including an outer wall, means within the receptacle and spaced from the outer wall for attaching the receptacle to the container to receive said liquid solution and to hold said solution within said receptacle at said predetermined level and between said outer wall and said means for attaching, a plurality of tubular structures, each structure being substantially straight, the tubular structures each being in fluid communication with the interior of in the receptacle and oriented to have an outer opening that is above and at least ¾ of an inch, but no more than 1½ inches, beyond said predetermined level of said liquid solution in the receptacle when the hummingbird feeder is positioned to dispense liquid solution to hummingbirds.

6. A hummingbird feeder as set forth in claim 5 in which the tubular structures are integral with the receptacle.

7. A hummingbird feeder as set forth in claim 5 including means to inhibit birds from landing on said tubular structures.

8. A hummingbird feeder as set forth in claim 7 in which the means to inhibit birds from landing on the tubular structures includes a disc extending outward from the receptacle and overlying, but spaced from the openings in the tubular members sufficiently to permit access by hummingbirds to the openings.

* * * * *